(12) United States Patent
Russell

(10) Patent No.: US 8,752,753 B2
(45) Date of Patent: Jun. 17, 2014

(54) WEAR PIECE ELEMENT AND METHOD OF CONSTRUCTION

(76) Inventor: Mark Russell, Sheffield (GB)

( * ) Notice: Subject to any disclaimer, the term of this patent is extended or adjusted under 35 U.S.C. 154(b) by 414 days.

(21) Appl. No.: 13/141,457

(22) PCT Filed: Dec. 22, 2009

(86) PCT No.: PCT/GB2009/051756
§ 371 (c)(1),
(2), (4) Date: Jul. 15, 2011

(87) PCT Pub. No.: WO2010/073035
PCT Pub. Date: Jul. 1, 2010

(65) Prior Publication Data
US 2012/0121846 A1    May 17, 2012

(30) Foreign Application Priority Data
Dec. 22, 2008  (GB) .................................. 0823339.7

(51) Int. Cl.
*B23K 1/008*    (2006.01)
*B23K 31/02*    (2006.01)

(52) U.S. Cl.
USPC ........... 228/121; 228/159; 228/174; 228/177; 228/178

(58) Field of Classification Search
None
See application file for complete search history.

(56) References Cited

U.S. PATENT DOCUMENTS

| 3,830,321 A | * | 8/1974 | McKenry et al. ............ 175/332 |
| 4,605,157 A | * | 8/1986 | Barr et al. ..................... 228/132 |
| 4,902,073 A | * | 2/1990 | Tomlinson et al. .......... 299/81.1 |
| 5,431,239 A | * | 7/1995 | Tibbitts et al. ................ 175/428 |
| 5,484,191 A | * | 1/1996 | Sollami ......................... 299/105 |
| 5,551,760 A | * | 9/1996 | Sollami ......................... 299/105 |
| 5,906,245 A | * | 5/1999 | Tibbitts et al. ................ 175/426 |
| 7,429,152 B2 | * | 9/2008 | Oles et al. ..................... 408/145 |
| 8,146,687 B1 | * | 4/2012 | Vail ................................ 175/426 |
| 8,162,082 B1 | * | 4/2012 | Gonzalez et al. ............. 175/428 |

(Continued)

FOREIGN PATENT DOCUMENTS

| EP | 1036913 A1 | 9/2000 |
| EP | 1212511 B1 | 10/2003 |

(Continued)

OTHER PUBLICATIONS

European Patent Office, International Search Report for PCT/GB2009/051756, Jul. 1, 2010.

(Continued)

*Primary Examiner* — Kiley Stoner
(74) *Attorney, Agent, or Firm* — Keeling Patents & Trademarks, LLC; Kenneth A. Keeling; Melissa M. Martinez

(57) ABSTRACT

A method of construction of a tungsten carbide/TSP insert for hard facing a wear surface comprises the steps of forming a tungsten carbide body (12) in a mold. After the molding step, a channel section slot (24) or pocket (24') is created in the body before it has hardened substantially. The body is then heat-treated to harden it. A TSP body (32) is fitted in the slot/pocket (24/24') so that it is a close sliding fit between the sides (18) of the slot, and is of the same depth as the slot. The TSP is (preferably) brazed into the slot. The insert has pips (30) on its edges (18) to facilitate welding to a substrate prior to a final brazing step.

11 Claims, 3 Drawing Sheets

(56) References Cited

U.S. PATENT DOCUMENTS

| | | |
|---|---|---|
| 2005/0247486 A1* | 11/2005 | Zhang et al. .................... 175/57 |
| 2005/0269139 A1* | 12/2005 | Shen et al. .................... 175/430 |
| 2006/0032677 A1* | 2/2006 | Azar et al. .................... 175/430 |
| 2009/0158898 A1* | 6/2009 | Sherwood et al. ........... 76/108.4 |
| 2010/0101868 A1* | 4/2010 | Izaguirre et al. ............. 175/428 |
| 2010/0187020 A1* | 7/2010 | Zhang et al. .................. 175/428 |
| 2010/0264198 A1* | 10/2010 | Voronin et al. ............... 228/226 |
| 2010/0276200 A1* | 11/2010 | Schwefe et al. ................ 175/57 |
| 2010/0319996 A1* | 12/2010 | Reese ............................. 175/57 |
| 2010/0326741 A1* | 12/2010 | Patel ............................ 175/431 |
| 2012/0261977 A1* | 10/2012 | Hall et al. .................... 299/100 |
| 2013/0220707 A1* | 8/2013 | Shen et al. .................... 175/432 |
| 2013/0277121 A1* | 10/2013 | Stevens et al. ................ 175/425 |
| 2013/0313027 A1* | 11/2013 | Sani ............................. 175/428 |

FOREIGN PATENT DOCUMENTS

| | | |
|---|---|---|
| GB | 2431948 | 5/2007 |
| WO | 95/27588 A1 | 10/1995 |
| WO | 98/13572 A1 | 4/1998 |
| WO | 99/05391 A1 | 2/1999 |
| WO | 02/16725 A1 | 2/2002 |

OTHER PUBLICATIONS

European Patent Office, Written Opinion of the International Searching Authority, Jun. 22, 2011.

* cited by examiner

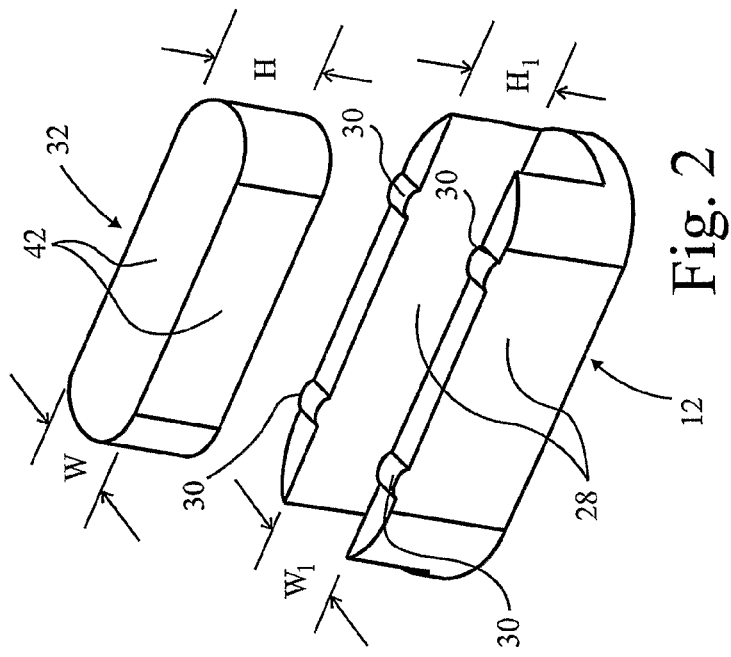
Fig. 1
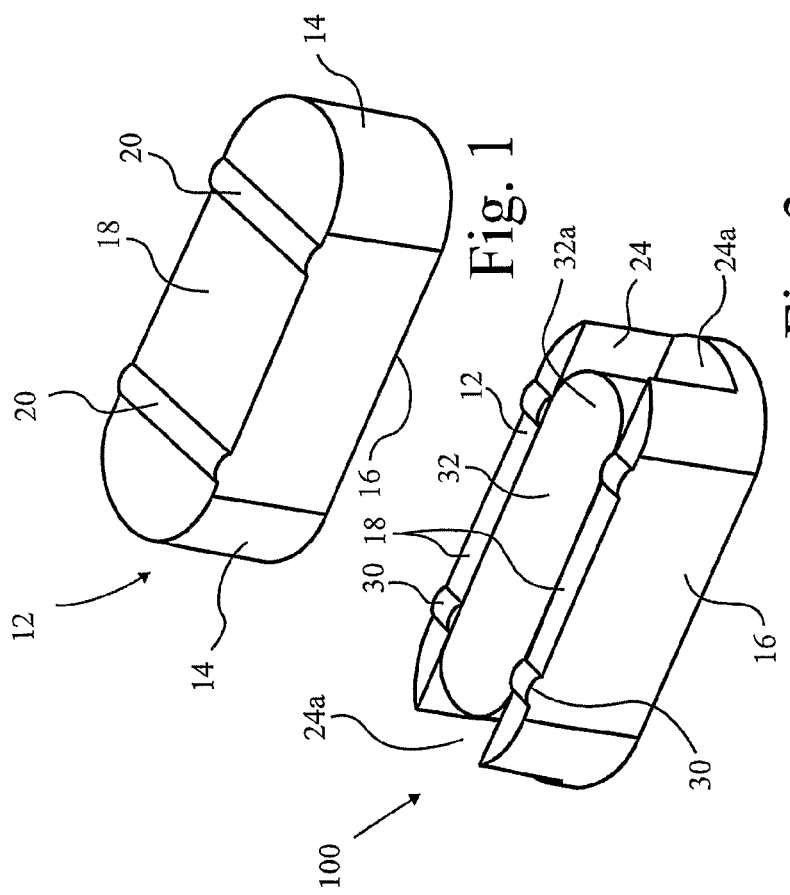
Fig. 2
Fig. 3

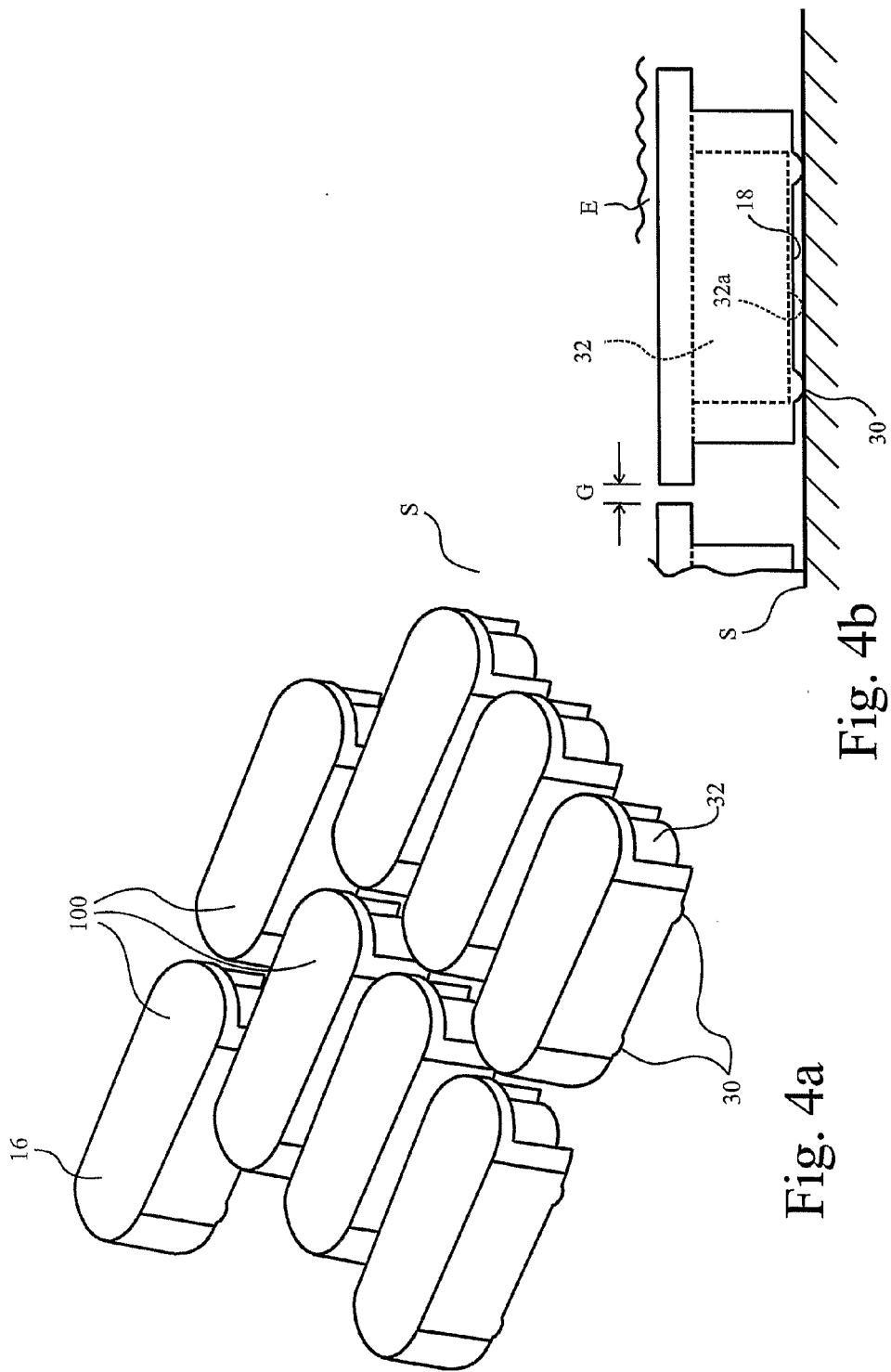

WEAR PIECE ELEMENT AND METHOD OF CONSTRUCTION

CROSS-REFERENCE TO RELATED APPLICATIONS

This application claims the benefit of, and priority to, application number 0823339.7, which was filed in the United Kingdom on Dec. 22, 2008, which application is incorporated herein by reference as if reproduced in full below.

STATEMENT REGARDING FEDERALLY SPONSORED RESEARCH OR DEVELOPMENT

Not applicable.

FIELD OF THE INVENTION

This invention relates to a wear piece element, and a method of construction thereof, for use especially in downhole drilling equipment, particularly to face the surface of stabilisers. Wear faces also exist on fishing tools and on drilling bits and other components. They are simply the surfaces of tools designed to bear against a substrate and to wear. Accordingly, it is generally desirable that wear faces are resistant to wear and therefore are correspondingly hard.

BACKGROUND

Stabilisers are well known for centralising a drill string in a hole and when the stabiliser is adjustable to permit a change in direction of a drill string. Stabilisers involve surfaces, often cylindrical in part, either straight or spiraled, that bear against the surface of the hole being drilled. Such surface is of course hard and uneven and causes substantial wear of the part bearing against it. It is known to face the bearing surfaces with a plurality of tiles of tungsten carbide. See, for example, WO-A-99/05391. It is also known to use hard material, such as diamond and WO-A-99/05391 suggests inserts in the facing edges of stabilisers comprising tungsten carbide, polycrystalline diamond and cubic boron nitride.

The problem with polycrystalline diamond, or any hard facing elements, is attaching them to surfaces of tools. The tools themselves are generally made of a steel that has the correct strength and toughness for the applications the tool is intended for. However, even if it was cost-effective to do so, a tool would never be made entirely out of material that was hard enough to withstand the rigours of bearing against the bore surface during drilling operations. However, attaching a layer of material that is strong enough is difficult, particularly on surfaces that are moving in a direction parallel to the surface, with objects striking the surface tending to swipe off elements attached to the surface.

Tungsten carbide can be brazed to steel easily and securely enough, particularly when an entire surface is covered. However, WO-A-95/27588 addresses the problem of holding elements still while they are being brazed, because, as soon as braze melts, it reduces friction substantially between element and substrate and, on curved surfaces such as stabilisers, they tend to fall off. The solution proposed by WO-A-95/27588 is to tack-weld the elements first, so that the subsequent brazing step does not dislodge the elements and they can be accurately positioned.

However, tungsten carbide is not the hardest material available and polycrystalline diamond (PCD), and its construct, thermally stable polycrystalline diamond (TSP), are known to be harder and tougher in these applications. However, most braze materials do not readily wet TSP and so connecting them reliably is difficult. PCD is not always suitable, in any event. PCD generally includes the catalyst that facilitates the binding of the diamond crystals together. Because these tend to have different thermal properties, high temperature applications are frequently ruled out for PCD because differential expansion of catalyst can break up the PCD. Also, PCD tends to be chemically reactive, particularly in contact with steel, and may reduce diamond to graphite, carbon monoxide and carbon dioxide.

WO-A-99/05391 suggests embedding the TSP in pockets at the edge, and this works reasonably well when the direction of impacts is into the pockets. Indeed, PCD and TSP are used frequently on drill bits where precisely this direction of impact applies. However, as mentioned above, on stabilisers, the direction of impacts tends to be transverse, and, in any event, there are not the pockets in which to locate the TSP/PCD elements because they are to cover a large part of the surface of the stabiliser.

It is known to coat TSP and PCD with less hard material so that the elements formed in this way are capable of being connected to a substrate, but it is an expensive process to manufacture composite elements comprising a core of TSP or PCD and a coat of less hard material. EP-A-1212511 and EP-A-1036913 both suggest embedding TSP in a larger body of tungsten carbide. This results in a satisfactory product, but holding a TSP element inside a mould in which a tungsten carbide piece is to be sintered is problematic. EP-A-1212511 suggests providing a coating of electrically conductive material on the PCD so that they can be tack welded and then brazed in place.

GB-A-2323112 discloses a method of breaking out of a cased wellbore using a drilling bit that first cuts through the steel casing and second cuts the geological formation. Composite cutting inserts are disclosed that comprise an annular body of tungsten carbide (or $Al_2O_3$, TiC, TiCN, TiN or the like, suitable for milling steel and non-reactive therewith) provided with a chip-breaking edge and a cylindrical body of ultra-hard material such as polycrystalline diamond. However, no method of connection is disclosed between them.

GB-A-2431948 discloses a catalyst-free polycrystalline ultra hard body (TSP) brazed to two separate back and side support elements (tungsten carbide) for use on a drill bit. Two support elements are employed so that they better support the TSP body and so that they can move relative to each other when the components are brazed together to remove voids and unwanted stress concentrations.

It is an object of the present invention to provide a simple construction of wear surface incorporating hard materials such as TSP.

BRIEF SUMMARY OF THE DISCLOSURE

In accordance with the present invention there is provided a method of construction of a tungsten carbide/ultra-hard insert for hard-facing a wear face, said method comprising the steps of:
  forming a tungsten carbide body with a slot or pocket;
  fitting an ultra-hard body in said slot or pocket; and
  fixing the ultra-hard body therein.

By "ultra-hard body" is meant a body of material harder than tungsten carbide and comparable to polycrystalline diamond (PCD), thermally stable polycrystalline diamond (TSP) or similar materials such as cubic boron nitride. Preferably, said ultra-hard body is TSP.

Said tungsten carbide body may be pressed into a solid body without sintering, said slot then being cut in the body, and said body then being sintered. Said cut may be made with a suitable (eg diamond) grinding wheel using a single pass to form the slot.

The advantage of this arrangement is that an essentially solid block of the tungsten carbide is formed without the necessity of the tungsten carbide powder to compact evenly into narrow fillets during the pressing stage of its formation. However, before the body is finally sintered, it is relatively easily cut with a suitable grinding wheel using a single pass to form the slot.

By "fixing" is meant either "at least temporarily retaining" or a more permanent securing such as by brazing.

The slot or pocket is preferably in a bottom face of the insert that is adapted to seat on a substrate and wherein fixing the insert on the substrate is effected by a brazing step. The edges of the slot or pocket on said bottom face may be adapted for welding to the substrate for intermediate fixing of said insert. The welding may be by tack-welding, that is by an electric discharge and resistance heating.

Preferably, two ridges are formed across the tungsten carbide body such that said slot cuts the ridges and leaves four pips, two on each edge of the slot, whereby said welding step is facilitated by concentrating electric discharge through said pips comprising the primary contact with the substrate.

During said brazing step (of the insert to the substrate), braze material may flow between said ultra-hard body and the substrate surface, and between the edges of the slot or pocket of the tungsten carbide body and the substrate surface, and between adjacent inserts. Said brazing is preferably effected by flame-spraying.

However, the step of brazing said ultra-hard body in said slot is preferably a separate and preceding step to the step of brazing said insert to a substrate. Indeed, preferably, the step of brazing said ultra-hard body in said slot is performed in a furnace using a first braze material.

The advantage of this arrangement is several-fold. Firstly, the brazing can be conducted in a controlled environment in the furnace, whereby the conditions under which a successful braze joint between TSP and tungsten carbide can more readily be achieved and controlled. Secondly, the nature of the braze material can be optimised for the bond intended. Thirdly, although somewhat related to the first, pure heat can be employed to effect the braze at precisely the correct temperature without washing the surfaces of the TSP with flame that would overheat and undermine the chemical stability of the TSP body.

However, as mentioned above, a mere temporary retention of the ultra hard body in the slot or pocket is all that is required when the insert is subsequently fixed to a substrate by brazing. Such temporary fixing may be by gluing. Alternatively, the edges of the tungsten carbide body could be crimped to hold the ultra hard body. This has the advantage that the separate and preceding brazing step is not required.

In accordance with a different aspect of the present invention there is provided a tungsten carbide/ultra-hard insert for hard facing a wear surface, said insert comprising:
a tungsten carbide body,
a channel section slot or a pocket in the body; and
an ultra-hard body fixed in said slot or pocket.

Preferably, pips are disposed on the edges of the channel section slot or pocket to facilitate tack-welding of the insert onto a substrate. Tack-welding as is well known employs resistance heating through electric discharge.

Said pips may be the remnants of a pair of ridges across the base of the insert prior to formation of said channel section slot.

In accordance with a third aspect of the present invention there is provided a hard-faced substrate comprising the substrate and a plurality of hard-facing inserts brazed onto a face of the substrate, wherein the inserts comprise an insert as defined above or are made by the method defined above and wherein the ultra-hard body is rectangular in section across its length and the tungsten carbide body surrounds the ultra-hard body on at least three sides of said section, the fourth side lying against said face of the substrate, whereby the ultra-hard body is shielded from direct washing with flame in a flame-spray brazing method employed to braze the inserts to the substrate.

Preferably, the dimensions of the substrate are corrected after brazing of the inserts to the face of the substrate, said adjustment being effected by grinding the braze lying on the exposed faces of the insert and said exposed face, but without grinding the ultra-hard body. Indeed, the level of the face of the substrate may be set so that, once the inserts have been welded and brazed in position it will be necessary to remove at least a portion of the depth of the base of the pocket or slot to achieve a required dimension of the substrate.

In one embodiment of the present invention the substrate is a stabiliser and the wear faces to be hard-faced are the part-cylindrical surfaces of the stabiliser intended to bear against the bore of a wellbore. The stabiliser will have a specified diameter and preferably the grinding of the surface after brazing of the inserts to the wear faces removes some of the inserts to expose them and demonstrate to the user that the stabiliser has been hard-faced. The tungsten carbide bodies may be substantially rectangular in plan with circular ends, and this may be chosen as indicative that the inserts comprise an ultra-hard body as well as a tungsten carbide shell by which the ultra-hard body is located on the substrate.

BRIEF DESCRIPTION OF THE DRAWINGS

Embodiments of the invention are further described hereinafter, by way of example, with reference to the accompanying drawings, in which:

FIG. 1 is a perspective view of a tungsten carbide body;

FIG. 2 is a perspective view of a tungsten carbide body having a slot formed in it and a TSP body above it;

FIG. 3 is a perspective view of the TSP body received in the tungsten carbide body, to form an insert according to the present invention;

FIGS. 4a and b are a perspective view and side view of a hard-faced substrate in accordance with the present invention;

DETAILED DESCRIPTION

Figure 6:
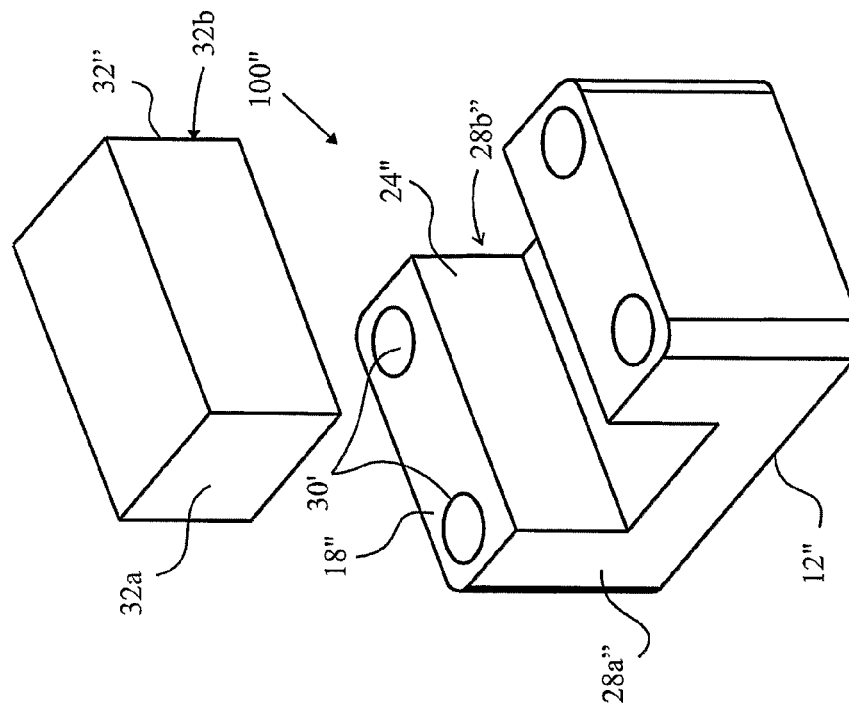
FIG. 6 is a further embodiment, being a variation of the FIGS. 2/3 and 5 arrangements.

In FIG. 1, a tungsten carbide body 12 is formed by the usual pressing process in which tungsten carbide grains are mixed with a binder in the form of cobalt or nickel and pressed together in a die of the appropriate shape to form a body as shown in FIG. 1. This shape is essentially cuboid, with rounded ends 14 and a flat top 16, and a base 18 which is also flat except for two ridges 20. The temperature at which the body is presintered does not result in complete melting of the binder and, accordingly, the body 12 created is not, at this stage, reaching its full hardness. It is straightforward, therefore, subsequently to run a circular diamond grinding wheel along the length of the body 12 to create a longitudinal slot 24 having a flat bottom 26 and side walls 28. The cutting of the slot 24 divides the ridges 20 into four pips 30.

The tungsten carbide body 12 is given its final sintering to complete the cementation of the tungsten carbide and optimise the body for hardness.

A TSP body 32 is formed using known techniques. It has a width W slightly less than the width $W_1$ of the slot 24. Moreover, it has a height H, the same as the depth $H_1$ of the slot 24.

Accordingly, when the TSP body 32 is inserted into the slot 24, a hard facing insert 100 (see FIG. 3) is formed. However, at this stage, there is no retention of the TSP body in the slot 24. For this purpose, the body 32 is coated with a first braze material. A suitable braze material is nickel or copper-based alloys, such as nickel chrome boron. The assembled insert 100 is then heated in a furnace to 1100 deg C. The braze melts and bonds the TSP, usually by way of an intermediate coating on the TSP (such as titanium, tungsten, nickel and copper, amongst others), to the tungsten carbide body 12.

When the insert 100 has been assembled, it can then be applied to a substrate, such as a stabiliser wear surface, by the techniques described in WO-A-95/27588. The pips 30 form contact points with the substrate and, when an electric welding electrode is applied to the top 16 of the insert 100 an initial weld, caused by resistance heating at the point of contact between the insert 100 and substrate, can be effected. Moreover, the pips 30 are arranged so that the remaining gap between the edges 18 of the slotted body 12 and the substrate are such that melted braze in a subsequent brazing step can penetrate between the edges 18 and the substrate by capillary action. Furthermore, given that the height H of the body 32 is the same as the depth $H_1$ of the slot 24, then the bottom face 32a of the TSP element is flush with the edges 18.

Accordingly, when flame-spraying of a second braze is effected, in a subsequent step, the flame-sprayed braze is melted and penetrates all the voids between the surfaces 18,32a and the substrate and between the inserts 100 and their neighbours.

The second braze preferably has a melting temperature less than the first braze material, and the flame spraying is controlled so that the temperature of the substrate and inserts does not rise above the melting temperature of the first braze. This ensures that there is no possibility of compromising the connection between the TSP and the tungsten carbide bodies.

However, even if the same braze material is employed, or the second has a higher melting point than the first, nevertheless, this is unlikely to damage the connection between the TSP and the tungsten carbide, and the TSP is in any event fully encased in the slot 24 and so protected from adverse effects of the flame spray.

This penetration includes into pockets 24a defined at either end of the slot 24 by virtue of the length of the TSP body 32 not extending to the full length of the tungsten carbide body 12. The pockets 24a are not essential, however. They exist purely because TSP bodies 32 of the shape shown in FIG. 2 are currently easily available, as are tungsten carbide bodies 12 of the shape shown in FIG. 1. If construction of the moulds for the two bodies 12,32 were to be designed from first principles, the TSP body 32 might have the same shape, but it is likely that the body 12 would be rectangular of a similar length to the body 32. This would still leave two corner pockets (not shown) at each end of the composite insert 100, but that would better enable the tungsten carbide bodies 100 to shield the bodies 32 from the effect of the flame brazing process.

Once the attachment of the inserts 100 is complete, the hard faced substrate is ground to the design surface dimensions, preferably with enough braze material being removed to expose the tops 16 of each insert 100, so that they can be seen, indicating to the user that the surface in question had been hard faced. Indeed, the oval shape of the insert 14 can be employed to demonstrate that the hard facing is a TSP composite.

Turning to FIGS. 4a and b, a substrate S (for example, the part-cylindrical surfaces of a stabiliser) has a plurality of inserts 100 connected thereto. These can be conveniently provided as a mat, with top surfaces 16 adhered to perforated paper, one perforation per insert. When the inserts are positioned on the substrate S the electrode of a tacking welding gun is applied to the top surface 16 (through the perforation in the paper backing, not shown) and energised. The current flows through the pips 30 causing them to melt and the inserts temporarily to be attached to the substrate. Subsequently, during the flame-spraying process, the paper is burnt off and braze penetrates the regular gap G provided between the inserts filling the voids including end spaces 24a and the gaps between the bottom edges 18, and the bottom surface 32a of the TSP body 32, and the substrate S. Finally, excess braze E is removed in the final sizing grinding operation.

Indeed, providing 1 or 2 millimeters of tungsten carbide on the top T of the assembly allows the tool to be ground easily to its finished size; the TSP 32 will then be exposed after an initial wear phase has taken place, thereafter providing the enhanced wear resistance diamond can offer.

Figure 5:
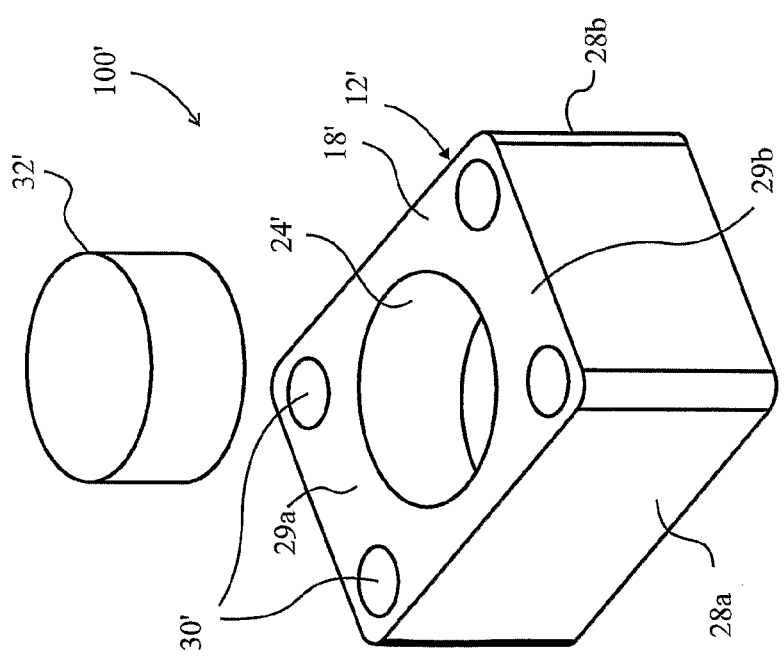
FIG. 5 is a further embodiment of an insert according to the present invention.

Turning to FIG. 5, an alternative embodiment is illustrated of an insert 100' in accordance with the present invention. Here, instead of a slot, a pocket 24' is formed in a tungsten carbide body 12'. A cylindrical TSP body 32' is a close sliding fit in the pocket 24', and can be brazed in there as per the embodiment described above with reference to FIGS. 1 to 3. Here, the inert 100' is not intended for a stabiliser as a facing tile, but is a wear element in the form of a tooth for use on a fishing tool, or more especially, a break out tool. In any event, the insert enables the tool to be provided with a rake angle by virtue unequal heights of walls 28a,b of the body 12'.

The edge 18' of the body 12' is provided with four pips 30' for tack-welding the insert 100' in place, prior to brazing by flame-spraying. As previously described, the step of brazing the TSP body 32' into the pocket 24' is preferably carried out previously in a controlled environment of a furnace. The TSP body may be pre-coated to aid wetting thereof by the braze material. The coating may be of titanium, tungsten, nickel and copper, amongst others. The walls 28a,b, as well as the ends 29a,b of the tungsten carbide body 12' entirely surround the TSP body 32'. Even more so than the previous embodiment, therefore, when the insert 100' is placed against the substrate on which it is to be mounted (with the pips 30' abutting the substrate), these walls 28/29,a/b, as well as the substrate (not shown) shield the TSP almost entirely from the adverse effects of the brazing torch flame. Accordingly, the TSP is in good condition when exposed by wear of the tungsten carbide around it, to provide its enhanced wear resistance.

Finally, FIG. 6 illustrates of an insert 100" in accordance with the present invention that is a combination and variation of the embodiments described above. Here, the body 12" is most like the body 12' in FIG. 5, but instead of a pocket 24', a slot 24" is formed in a tungsten carbide body 12". A cuboid TSP body 32" is a close sliding fit in the slot 24" so that its ends 32a,b are contiguous with end faces 28"a,b of the tungsten carbide and the body 32" completely fills the slot 24". The insert can be brazed in, as per the embodiments described above. Here, the inert 100" is suitable both for a stabiliser as a facing tile and as a wear element in the form of a tooth for use on a fishing tool or a break out tool.

As with FIG. 5, the edge 18" of the body 12" is provided with four pips 30' for tack-welding the insert 100" in place, prior to brazing by flame-spraying. Although the tungsten carbide body 12" does not entirely surround the TSP body 32', when the insert 100" is tiled onto a substrate on which it is to be mounted (with the pips 30' abutting the substrate), the exposed faces of the inserts effectively shield the TSP almost entirely from the adverse effects of the brazing torch flame. Accordingly, the TSP is in good condition when exposed by wear of the tungsten carbide around it, to provide its enhanced wear resistance.

As mentioned above, the hard body 32,32',32" can simply be glued in place in the slots 24,24" or pocket 24', using an epoxy resin, a cyanoacrylate glue or other suitable glue. Alternatively, the edges 18,18',18" of the tungsten carbide body may be crimped to provide an interference holding of the body in the slot or pocket to hold the body during subsequent transportation and handling prior to the insert 12 being fixed as described above to the substrate.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method of hard-facing a substrate comprising:
   constructing a tungsten carbide/ultra-hard insert by:
   forming a tungsten carbide body with a slot or forming a tungsten carbide body with a pocket having a shape of an aperture;
   fitting an ultra-hard body in said slot or pocket;
   fixing the ultra-hard body therein by brazing said ultra-hard body in the slot or pocket of the tungsten carbide body using a first braze material; and
   hard-facing said substrate with the insert by brazing said insert to the substrate, wherein the step of brazing said ultra-hard body in said slot or pocket is a separate and preceding step to a step of brazing said insert to the substrate.

2. A method as claimed in claim 1, wherein said tungsten carbide is pressed into a solid body, said tungsten carbide is presintered, said slot is then cut in the body, and said body is then sintered.

3. A method as claimed in claim 2, wherein said cut is made with a diamond grinding wheel to form the slot.

4. A method as claimed in claim 1, wherein said ultra-hard body is TSP.

5. A method as claimed in claim 1, wherein the slot or pocket is in a bottom face of the insert adapted to seat on a substrate and wherein edges of the slot or pocket on said bottom face are welded to the substrate for intermediate fixing of said insert between said brazing steps.

6. A method as claimed in claim 1, wherein the step of brazing said ultra-hard body in said slot or pocket is performed in a furnace.

7. A method as claimed in claim 4, wherein the TSP body is coated with a material that facilitates adhesion of a braze material.

8. A method as claimed in claim 7, wherein the coating is selected from the group comprising titanium, tungsten, nickel and copper.

9. A method as claimed in claim 3, wherein edges of the slot or pocket on said bottom face are adapted to be welded to the substrate for intermediate fixing of said insert and wherein two ridges are formed across the tungsten carbide body such that said slot cuts the ridges and leaves four pips, two on each edge of the slot, whereby said welding step is facilitated by concentrating electric discharge through said pips comprising the primary contact with the substrate.

10. A method as claimed in claim 1, wherein the ultra-hard body is shielded by the tungsten carbide body from direct washing with flame in a flame-spray brazing step employed to braze the inserts to the substrate.

11. A method as claimed in claim 10, in which the dimensions of the substrate are corrected after brazing of the inserts to the face of the substrate, said adjustment being effected by grinding the braze lying on the exposed faces of the insert and said exposed face, but without grinding the ultra-hard body.

* * * * *